United States Patent [19]

O'Mara et al.

[11] Patent Number: 4,789,383

[45] Date of Patent: Dec. 6, 1988

[54] RAPID DISSOLVING POLYMER COMPOSITIONS AND USES THEREFOR

[75] Inventors: Dion P. O'Mara, Vienna, Va.; Albert F. Hadermann, Ijamsville, Md.; Jerry C. Trippe, Fairfax Station, Va.

[73] Assignee: General Technology Applications, Inc., Manassas, Va.

[21] Appl. No.: 121,276

[22] Filed: Nov. 16, 1987

Related U.S. Application Data

[62] Division of Ser. No. 807,947, Dec. 12, 1985, Pat. No. 4,720,397.

[51] Int. Cl.$^4$ .................................................. C10L 1/02
[52] U.S. Cl. ............................................ 44/55; 44/62; 44/68; 44/76
[58] Field of Search ................. 44/55, 62, 68, 76; 427/180, 222

[56] References Cited

U.S. PATENT DOCUMENTS

| | | | |
|---|---|---|---|
| 4,002,436 | 1/1977 | Osmond et al. | 44/62 |
| 4,345,013 | 8/1982 | Diamond et al. | 430/106.6 |
| 4,584,244 | 4/1986 | Fenton | 428/407 |
| 4,647,291 | 3/1987 | Eckert | 44/68 |

*Primary Examiner*—William R. Dixon, Jr.
*Assistant Examiner*—Margaret B. Medley
*Attorney, Agent, or Firm*—Roland H. Shubert

[57] ABSTRACT

A particulate, free-flowing and rapid dissolving polymer composition is prepared by comminuting a high molecular weight thermoplastic or viscoelastic polymer at a temperature below its glass transition temperature while maintaining the polymer in an inert environment. A finely divided, solid coating agent is mingled with the comminuted polymer while maintaining the polymer particles in a cold and inert atmosphere. The particles of coating agent form a protective shell around each polymer particle by tumble mixing the components while raising the temperature of the mixture. The polymer composition finds use as a drag reducing agent; as an anti-misting agent; to enhance the efficiency of oil skimming processes and devices; and for the preparation of polymer solutions for other uses.

6 Claims, 2 Drawing Sheets

10µm

1µm

RAPID DISSOLVING POLYMER COMPOSITIONS AND USES THEREFOR

This is a division of application Ser. No. 807,947, filed 12 Dec. 1985 now U.S. Pat. No. 4,720,397.

BACKGROUND OF THE INVENTION

This invention relates generally to the processing of high molecular weight polymers to form compositions which are readily dissolvable and to uses for these compositions.

More specifically, this invention relates to a method for producing highly active, rapidly dissolving polymer compositions and to processes in which such polymer compositions find use.

High molecular weight, thermoplastic or viscoelastic polymers are notoriously difficult to dissolve without degradation and without significant reduction in molecular weight. It is not uncommon for such polymers to require several weeks of gentle agitation in a solvent to dissolve completely. Even then the concentration of polymer in such solutions is limited to a few percent at best because of the rapid increase in viscosity with increasing polymer concentration.

Dilute solutions of high molecular weight polymers in solvents such as hydrocarbons display unusual and useful flow characteristics. In particular, certain linear polymers, such as the high molecular weight alpha-mono olefinic polymers are noted for their effectiveness as drag reducing agents and as anti-misting agents. A drag reducing agent is a polymer which, when dissolved in a solvent, substantially reduces the friction loss during turbulent flow of the solution. An anti-misting agent is a polymer which, when dissolved in fuel, serves to significantly increase median droplet size and reduce flammability of fuel sprays caused by high velocity wind shear such as occurs during an aircraft crash landing.

A number of different approaches have been taken in the prior art to the problem of preparing large quantities of extremely dilute solutions—usually between five and about one hundred ppm—which are required for either drag reduction or anti-misting fuel use. For example, British Pat. No. 1,452,146 describes a method and apparatus for dissolving high molecular weight polymers on a large scale in solvents such as crude oil without significant polymer degradation. Patentees use a dissolving vessel having at least two compartments formed by a partition with provision for liquid communication between the compartments at the top and bottom of the partition. Polymer is introduced into moving or agitated solvent within the vessel to form a slurry. Agitation is accomplished by sparging gas into the bottom of one of the compartments to disperse the polymer particle throughout the solvent so as to prevent the polymer particles from agglomerating and to speed the dissolution process. Exemplary data set out in the patent shows the dissolving of crumb or cut polyisoprene of about 8 million molecular weight in crude oil at 32° C. to form a solution of about 0.92% in about 120 to 160 hours. The molecular weight of the rubber was reduced by about 10% during the dissolution. The maximum concentration of polymer obtainable is determined by the viscosity of the final solution and, for high molecular weight polymers, maximum concentration ranges from about 0.5 to 2% by weight. The solution of polymer obtained is then metered into a flowing stream of crude oil to provide drag reducing effects.

A very different approach to the dissolving of high molecular weight polymers is shown by the Weitzen patent, U.S. Pat. No. 4,340,076. Weitzen found that high molecular weight polymers would very rapidly, almost instantaneously, dissolve in solvents for those polymers if the polymer was comminuted at cryogenic temperatures and the resulting polymer particles were introduced into the solvent without allowing them to warm. Polymer concentrations in the solution ranging from a few parts per million to 15% or more could readily be obtained. Essentially no polymer degradation, as indicated by a reduction in the molecular weight of the polymer, occurs during the dissolution.

Yet another approach to the preparation of dilute solutions of high molecular weight polymers is set out in the Mack patent, U.S. Pat. No. 4,433,123. Here, a solution of a high molecular weight polymer, suitable for use as a drag reducing agent or anti-misting agent, is produced by polymerization of an alpha-olefin in a hydrocarbon solvent. The entire mixture, containing polyolefin, solvent and catalyst particles, is used without separation to make up dilute solutions of the polymer in crude oil or other hydrocarbons.

This last approach, to use the entire reaction mixture of a polymerization process, is presently most favored from a commercial standpoint because of the great difficulties experienced in dissolving solid polymers without degradation. Drag reducing agents in field use today typically comprise a high molecular weight polymer dissolved in the polymerization solvent, which may be hexane or heptane, at a concentration ranging from a low of 2 to 3% to a maximum of 11 to 12%. These polymer solutions at typical commercial concentrations are thick, viscous liquids which are highly thixotropic and are also highly viscoelastic. They are commonly transported and stored in containers which can be pressurized with an inert gas to pressures of 30 to 70 psig in order to discharge the liquid from the container. Generally speaking, the lower the polymer concentration, the more rapidly and easily it will dissolve in crude oil or other liquids. The upper limit to polymer concentration is set by practical considerations including the need for an acceptably short dissolving time and the need to handle the concentrated polymer solution using readily available and reasonably priced equipment.

As may readily be appreciated, all three of the prior art approaches to the preparation of polymer solutions for drag reducing or anti-misting purposes have significant disadvantages. Dissolving solid polymer directly into crude oil or other hydrocarbons is very time consuming, requires large dissolving vessels because of the long dissolving time, and almost inevitably results in significant degredation of the polymer. The Weitzen dissolving process requires a source of liquid nitrogen for its operation. The present commercial approach, which utilizes the entire polymerization mixture, is unwieldy because the polymer solution must be transported and stored in pressure vessels such as those used to ship and store propane and butane. It also incurs a substantial financial penalty for transportation because little more than 10% of the mixture is polymer; the active ingredient in drag reducing or antimisting solutions. Also, the valuable solvent in which the polymer is dissolved cannot be recovered but instead becomes a part of the crude oil stream.

It is evident that a more highly concentrated, but easily handleable and fast dissolving, form of polymer would offer significant advantages over present systems in drag reduction and anti-misting applications as well as for a host of other uses.

SUMMARY OF THE INVENTION

Storage stable, non-agglomerating and rapid dissolving particulate polymer compositions are prepared by chilling the polymer to a temperature below its glass transition temperature using an inert cryogenic refrigerant such as liquid nitrogen and comminuting the chilled and brittle polymer to form particles thereof. The polymer particles are maintained at a temperature below the glass transition temperature of the polymer and are mixed with a finely divided, solid coating agent. The coating agent must be a solid, must be non-reactive toward the polymer and must have a median particle diameter less than one-tenth the median diameter of the polymer particles. The coating agent particles and the polymer particles are physically admixed while warming the mixture to and above the glass transition temperature of the polymer resulting in the coating agent formng a multi-layered shell around each polymer particle. The resulting polymer composition typically is free flowing and non-agglomerating. It may be used as a drag reducing agent or as an anti-misting agent by direct addition of the polymer composition into a crude oil or hydrocarbon fuel stream wherein the polymer rapidly dissolves without agglomeration.

Hence, it is an object of this invention to prepare polymer compositions in a form which is convenient for transport, storage and solution making.

It is another object of this invention to provide particulate polymer compositions wherein each polymer particle has an encompassing, multi-layered shell of a solid coating agent.

Yet another object of this invention is to provide a simple and convenient process for reducing the flowing friction of hydrocarbons in a pipeline.

It is another object of this invention to provide a method for the preparation of dilute polymer solutions.

Other objects of this invention will be apparent from the following description of preferred embodiments and exemplary uses.

BRIEF DESCRIPTION OF THE DRAWING

Certain exemplary embodiments of the invention are illustrated in the drawing in which.

DESCRIPTION AND DISCUSSION OF THE INVENTION

Figure 1:
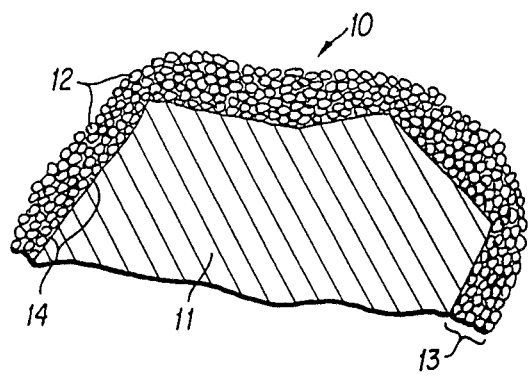
FIG. 1 is a stylized view of a partial cross section of a single coated polymer particle.

Various embodiments of this invention will be described and discussed in detail with reference to the drawing figures in which like reference numerals refer to the same component illustrated in different figures.

Referring first to FIG. 1, there is shown a portion of a single particle 10 of a polymer composition prepared in accordance with this invention. The composition comprises a center, or core, polymer particle 11 shown here in section. Polymer core particle 11 is preferably prepared by comminuting a more massive form of the polymer, in granulated or crumb form for example, using a hammer mill, pin mill or other suitable comminuting means. The polymers used in preferred embodiments of this invention comprise those thermoplastics, both natural and synthetic, which impart viscoelastic properties to a solution. Such polymers typically display glass transition temperatures in the range of about $-10°$ C. to about $-100°$ C. At temperatures below the glass transition temperature, the polymers become brittle and can be readily comminuted by use of impact-type mills. Exemplary polymers useful in this invention include polyisobutylene, polyisoprene, polyalphaolefins, polybutadiene, copolymers of styreny and butadiene, copolymers of ethylene and butene $-1$, fluoroelastomers such as the copolymers of vinylidene fluoride and hexafluoropropylene and other polymers of a generally similar nature.

In order to successfully comminute the polymers useful in this invention, it is necessary to chill the polymers below their glass transition temperature and to maintain the temperature below that point during comminution. Chilling is most conveniently accomplished by use of a liquid cryogenic refrigerant, preferably liquid nitrogen. Comminution of the polymer produces fragments or particles having fresh, clean surfaces. It has been found that preservation of these clean surfaces is mandatory if rapid dissolution of the polymer particles in a solvent is to be obtained. It is believed that active sites on freshly cleaved polymer surfaces react with the oxygen and water vapor normally present in the atmosphere to produce a film or skin around the particle which inhibits or greatly slows the dissolution of the polymer in a solvent. For this reason, it is mandatory also that the comminution be carried out in an inert atmosphere. The twin requirements of chilling the polymer and maintaining it in an inert atmosphere during comminution are best met through use of liquid nitrogen as a cryogenic refrigerant and inerting agent. It is possible, but not economically practical, to use other inert cryogenic refrigerants such as liquid argon rather than liquid nitrogen.

Polymer particles resulting from comminution are commingled with a particulate coating agent 12 while continuing to maintain the polymer particles in a chilled and inert atmosphere. The coating agent 12 must be a solid at ambient to moderately elevated temperature; must be non-reactive toward the polymer; and, most importantly, must have a particle size that is much smaller than is the particle size of the polymer. It is necessary that the median diameter of the coating agent particles 12 be less than one-tenth the median diameter of the polymer particles 11 and it is preferred that the difference in particle size between the two substances, coating agent and polymer, be substantially greater than that.

The particle size to which the polymer is comminuted is not critical but polymer particle size does affect the dissolving rate of the polymer composition in a solvent. It is generally preferred that the median polymer particle diameter be less than about 0.5 mm, or about 35 mesh. Additional advantage is often gained by reducing the median polymer particle diameter below about 0.075 mm which is equivalent to about 200 mesh. In all cases it is preferred that the median diameter of coating agent particles be less than about 0.01 mm or 10 micrometers. Experience to date indicates that the best results are obtained with coating agents having a median particle diameter of about 0.1 to about 10 micrometers.

The commingled polymer particles 11 and coating agent particles 12, in an inert atmosphere and at a temperture below the glass transition temperature, are then continuously mixed as by tumbling while the mixture is warmed to and above the glass transition temperature of the polymer. This procedure may conveniently be accomplished in a batch-wise fashion using a rotating V-Type blender. Heat transfer from the atmosphere through the blender shell is sufficient to warm the chilled mixture to and above the glass transition temperature of the polymer. It is preferred that tumble mixing be continued until the mixture approaches ambient temperature.

Tumble mixing of the polymer particles and coating agent while allowing the temperature to warm results in the formation of composite particles, each having a central core consisting of a solid polymer particle 11 with a multi-layered shell 13 surrounding the core and made up of particles 12 of the coating agent. It is, of course, necessary to provide a sufficient amount of coating agent relative to the polymer particles to allow for the formation of that multi-layered shell. The minimum amount of coating agent required on a weight or percentage basis depends upon the relative size of the coating agent particles as compared to the polymer particles as well as upon the specific gravity of the components and will generally be in excess of 15% by weight of the mixture. The optimum amount of coating agent usually is considerably higher than that and typically ranges from about 20% to about 75% by weight of the composition.

The multi-layered shell 13 of coating agent particles tightly adheres to the polymer core particle 11 and is not disrupted by physical handling. There are a number of reasons for the stability and physical integrity of the coating agent shell. Those polymers useful in this invention generally display a surface tackiness at temperatures above the glass transition temperature. Consequently, polymer particles, especially those particles having freshly formed surfaces, tend to agglomerate or stick together. At temperatures below the glass transition temperature, however, those same polymers form free flowing and non-adherent particles. Tumble mixing of the polymer particles with the much smaller coating agent particles while the temperature is raised through the glass transition temperature allows the polymer particles to be coated prior to the formation of tacky polymer surfaces.

There are other considerations of equal or possibly greater importance. The interaction between very finely divided particles to form agglomerates is well known. Also, the adherence of microscopic particles to solid surfaces is well known and has been much studied. For example, particles having a diameter of less than about 10 micrometers adhere so strongly to surfaces that accelerations of the order of $10^3$ to $10^4$ g-units are not sufficient to dislodge them from the surface. The forces involved in the adhesive interaction of small particles, one to another or to the surface of a larger particle, include molecular forces and to some degree Coulomb forces; the magnitude of these forces decreasing rapidly with increasing distance between the contiguous surfaces. Other forces arise when two particles contact each other or the surface of a larger particle. Such forces include electrical interactions due to surface charges and the like.

The surfaces of all of the particles, coating agent particles and polymer particles alike, also adsorb a gas layer. The gas adsorbed is that inert gas which is present during the formation of the composite particles through mixing and warming; usually nitrogen. All of the interstices 14 between and around coating particles 12 making up the multilayered shell 13 also are filled with nitrogen or other inert gas. Consequently, the composite particles 10 may be exposed to the atmosphere and freely handled without use of cautionary measures because the surfaces of each polymer particle 11 are protected from atmospheric contact by inert gas adsorbed on and filling the interstices between coating agent particles 12.

Figure 2:
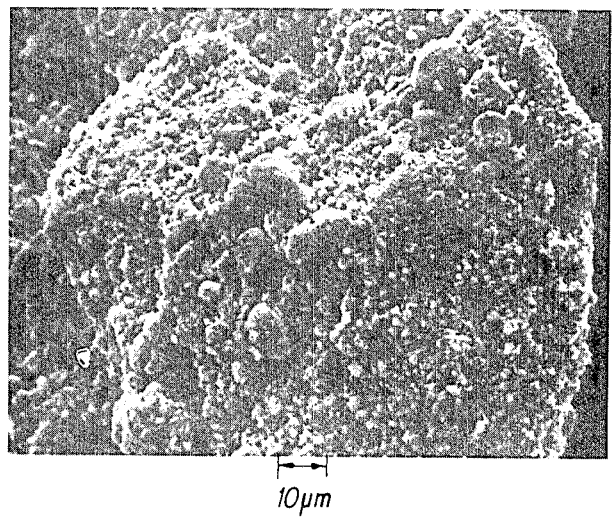
FIG. 2 is a photo-micrograph of a single, coated polymer particle.
Figure 3:
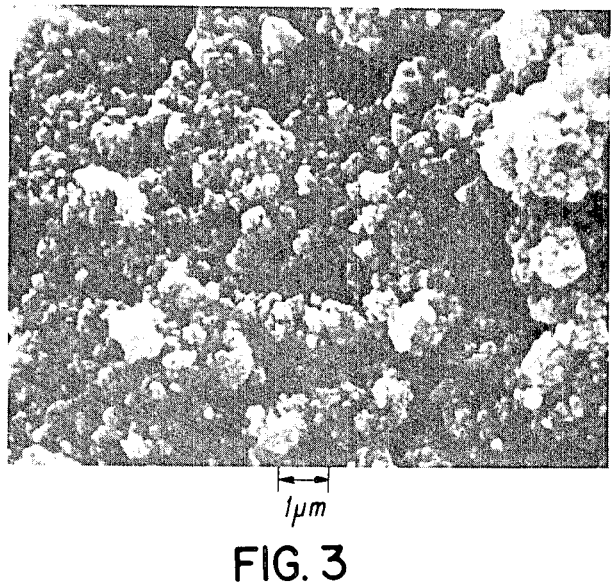
FIG. 3 is a photo-micrograph at higher magnification showing details of the coating surface.

Structural details of the composite particles 10 and particularly of the exterior surface of shell 13 are shown in FIGS. 2 and 3 which are electron micrographs of composite particles prepared by the process of this invention. In both of FIGS. 2 and 3, the particle core is a high molecular weight polyisobutylene while the coating agent is very finely divided tricalcium phosphate (TCP). FIG. 2 shows a single particle 10 having a diameter of about 0.1 mm (100 micrometers) as is shown by the scale across the bottom of the Figure. This Figure clearly shows the close packed nature of the TCP particles making up the exterior shell of particle 10. FIG. 3 is a detailed view of the surface of a particle 10 at much higher magnification. As can be seen by reference to the scale at the bottom of this Figure, the individual particles are typically much less than one micrometer in diameter. It may also be appreciated from study of this Figure how effectively shielded from atmospheric contamination is the central polymer core by the multi-layered TCP coating with the nitrogen gas adsorbed on particle surfaces and filling the interstices between particles.

As has been set out previously, the coating agent must be a solid at ambient to moderately elevated temperature; must be non-reactive toward the polymer; and must have a particle size that is much smaller than is the particle size of the comminuted polymer particles. In experimental tests using a variety of coating agent compositions, it was found that all compositions tested were operative to produce coated polymer particles in accordance with this invention provided that the criteria set out above were met. Coating agents tested included amorphous silicon dioxide, kaolin clay, calcined kaolin clay, graphite, Teflon powder and tricalcium phosphate.

This is not to say, however, that the compositions obtained through use of the different coating agents are all of the same or equal usefulness. The properties of the coating agent used, its wettability by hydrocarbons for example, do affect the results obtained in specific process applications. One such process application is the use of the polymer compositions of this invention as drag reducing agents in the flow of hydrocarbons, especially crude oil, through pipelines. Polymer compositions having a tricalcium phosphate (TCP) coating are presently preferred for these uses.

Figure 4:
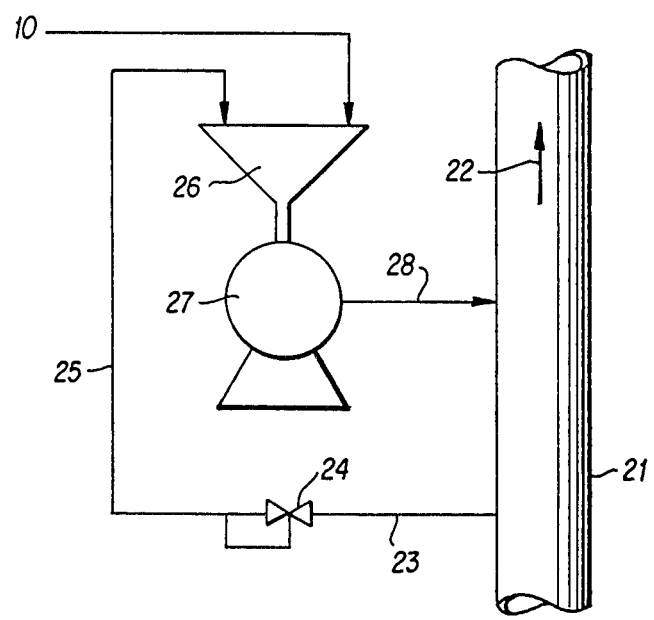
FIG. 4 is a diagrammatic flowsheet of a process for reducing the flowing friction of hydrocarbons in a pipeline.

FIG. 4 illustrates the simplicity of approach and apparatus required for pipeline drag reduction allowed through use of the compositions of this invention. There is shown a segment of a pipeline 21 having crude oil, or other hydrocarbon stream, flowing in the direction of the arrow 22. The crude oil in pipeline 21 typically would be at a pressure in the range of about 500 to 1,500 psig and would be flowing at a rate of about 4 to 15 feet per second. A side-stream 23 is removed from the pipeline and is let down to near atmospheric pressure through pressure reducing means 24. The low pressure oil stream 25 is directed to a liquid-solids mixing means 26 which feeds into the inlet of pump 27. Particles 10 of the polymer composition of this invention are also introduced into mixing means 26 which may comprise a conical, open-topped vessel having a bottom opening communicating directly with the inlet of pump 27. Pump 27 must be capable of discharging a metered stream 28 of the oil and polymer composition slurry from mixing vessel 26 into the high pressure pipeline 21. It has been found that a rotary, positive displacement gear pump is appropriate for use in this application.

The mixing means 26 and pump 27 must be so arranged that the hold-up time of the polymer composition-hydrocarbon slurry, as it passes from mixing means 26 to the interior of pipeline 21, is limited to a few seconds. A relatively short hold-up time is necessary because of the rapidity with which polymer composition 10 dissolves in hydrocarbons. A substantial degree of dissolution occurs within 20 to 30 seconds of contact by the polymer composition 10 with a hydrocarbon. Were any substantial degreee of dissolution to be allowed before entry of the slurry into pump 26, the viscosity of the mixture would increase and cause difficulties in pumping.

The polymer composition presently preferred for drag reduction use comprises a high molecular weight polyisobutylene core having a shell coating of tricalcium phosphate (TCP) prepared using liquid nitrogen as the refrigerant and inerting agent. Typical compositions comprise about 50% by weight each of polymer and of TCP coating. The composition is a free flowing powder which is stable in storage and which can be exposed to the atmosphere for many hours without loss of dissolving activity.

In contrast, commercial drag reducing agents are prepared as extremely viscous solutions containing a maximum of about 10% to 12% polymer by weight. The solutions must be shipped and stored in containers which can be pressurized to 50 psig or more with an inert gas in order to force the viscous liquid from the container. In at least some instances the drag reducing agent does not dissolve quickly enough in crude oil so a lighter solvent, which may be a distilled fraction from the crude oil, is provided to enhance the dissolving rate. As may be appreciated, a stable, powdered polymer composition having a polymer content of about 50% by weight and directly injectable into a pipeline provides substantial practical and economic advantages over those drag reducing agents provided in dissolved form as is now the standard in the art.

The amount of polymer required to provide a significant drag reducing effect depends to a great degree upon the molecular weight of the polymer and to a lesser degree upon the characteristics of the crude oil. Generally speaking, the effectiveness of a polymer as a drag reducing agent increases as an exponential function of its molecular weight. With those polymers in use today, polymer concentrations in crude oil range from about 2 to about 100 ppm, and most usually from about 5 to 50 ppm, to obtain the optimum drag reducing effect.

Certain polymer compositions of this invention may be slurried in water without affecting the stability of the exterior shell and without affecting its later wettability by hydrocarbons. For example, polymer compositions having an external particulate shell of TCP can be slurried in water and thereafter introduced into a hydrocarbon whereupon the polymer particles are immediately wet by hydrocarbons which penetrate the TCP shell with rapid dissolution of the polymer in the hydrocarbons. This characteristic of TCP-coated polymer compositions allows a modification of the process of FIG. 4. It is possible, and sometimes desirable, to dispense with oil side-stream 23 and provide instead a water stream (equivalent to oil stream 25) to the liquid-solids mixing means 26. The small quantity of water introduced into pipeline 21 as a slurrying liquid for the polymer composition is generally of no practical consequence as most crude oils normally contain at least small concentrations of water. The amount of liquid, whether oil or water, necessary to produce a pumpable slurry of the polymer composition is small; typically ranging from about 1 to 5 parts of liquid per part of polymer composition.

The process depicted in FIG. 4 may also be employed for the production of anti-misting fuels suitable for use in turbine and diesel engines. In this instance, line 21 would comprise an aircraft or land vehicle refueling line and polymer composition 10 would comprise a very high molecular weight polymer. Shell 13 would preferably consist of very finely divided (preferably less than 1 micrometer in diameter) TCP or graphite particles. Polyisobutylene of a molecular weight greater than 5 million is the most preferred polymer for this use.

It is well known in the art that polymeric solutes in jet or diesel fuels can serve to greatly increase the droplet size and reduce the flammability of fuel sprays created by high-velocity wind shear. It is also recognized that the effectiveness of the polymers used increases with molecular weight. It order to obtain effective anti-misting activity, it is necessary to add to the fuel sufficient polymer to substantially eliminate that population of fuel droplets having a diameter of less than about 50 micrometers normally produced when pure fuel is subjected to wind shear. While the amount of polymer required to achieve this result depends substantially upon the polymer molecular weight, concentrations of polymer in the fuel ranging from about 5 to about 100 ppm by weight are generally appropriate. The coating agent, TCP or graphite, is either retained on the fuel filters normally employed in aircraft or land vehicle fuel systems or harmlessly passes through the filters and engines.

Yet another significant area of use for the polymer compositions of this invention is in the mechanical recovery of spilled hydrocarbons from a water surface. It is common practice today to remove spilled hydrocarbons from the surface of water using a variety of mechanical skimmers including those which use weirs, vacuum nozzles, disks, a drum or a belt to contact the oil and remove it from the water surface. Performance of the various types of skimmers is closely related to the properties of the oil, particularly the viscosity of the oil. Each of these skimmers has the ability to rapidly clean the oil from the area immediately around it. After that time, the performance of a skimmer is determined not by its own capability to pick up oil but by the rate at which new oil flows across the water surface to the skimmer and by the rate at which the skimmer can be moved to new patches of oil.

All of the skimmers, whether they be a vacuum apparatus, a weir, a disk, drum or belt type, are limited in the rate at which they can be operated. For example, with a disk skimmer, the more rapidly the disks are rotated the greater the rate of oil pick-up until a maximum value is reached. Above a certain rotational speed, oil tends to be flung off the disk. Also, the rate of replenishment of oil on the water surface adjacent the disk limits the rate of oil pick-up. As can be appreciated, the viscosity of the spilled oil plays a major role in defining the maximum pick-up rate as viscosity affects both the oil loading on the disk (or other moving surface) as well as the flow rate of oil across the water surface.

It has been found that spreading the polymer composition of this invention in low concentration across the surface of a spilled oil or other hydrocarbon imparts viscoelastic properties to the oil as the polymer dissolves therein. The viscoelasticity imparted to the oil improves in dramatic fashion the performance of conventional oil skimmers. As the oil layer is pulled from the water surface by the skimmer, the viscoelasticity imparted to the oil by the dissolved polymer causes the oil layer to act as a stretchable rubber-like sheet. A disk or drum skimmer can then be operated at a higher rotational velocity without oil being flung from the disk or drum surface. Because of the viscoelasticity, oil is replenished at the skimmer site much more rapidly than is the case with untreated oil. Further, the oil as it is being depleted from the water surface does not break up into patches but rather is pulled in to the skimmer. All of these effects combine to enhance the recovery efficiency of a conventional skimmer by a factor as great as 3 to 6.

The concentration of polymer required to produce an adequate degree of viscoelasticity in a spilled oil depends in large part upon the molecular weight of the polymer and upon the viscosity of the oil. Generally speaking, the higher the polymer molecular weight and the higher the oil viscosity, the lower is the polymer concentration required to provide sufficient viscoelasticity to substantially improve skimmer performance. About 50 ppm by weight of polymer in crude oil represents about the lowest practical concentration to obtain significant improvement in skimmer efficiency. Little improvement is gained by providing polymer concentrations in excess of 1.0%, or 10,000 ppm, and in most instances appropriate concentrations of polymer in the oil will range from about 100 to 1000 ppm.

The polymer composition may be distributed across the surface of an oil spill using any conventional device ordinarily used for the spreading of particulate solids such as seeders, fertilizer spreaders, blowers and the like. A polymer composition comprising a very high molecular weight (above 5 million,) polyisobutylene having a multl-layered shell of TCP particles is particularly preferred for this application as the TCP shell is not affected by contact with water.

Various embodiments of the invention are more specifically described with reference to the following examples which are provided to further illustrate but not to limit the invention.

EXAMPLE 1

A quantity of high molecular weight polyisobutylene, designated as Oppanol B246 by the supplier, BASF, was obtained. The polymer was in the form of generally cubic chunks about 1 cm on a side and had been mixed with about 10% by weight of powdered tricalcium phosphate to keep the polymer chunks from sticking together.

The polyisobutylene chunks were fed, together with sufficient additional tricalcium phosphate (TCP) to form a 50—50 by weight mixture of the two components, into a cryo-chiller cooled with liquid nitrogen. The cryo-chiller discharged into a hammermill, which was cooled with additional liquid nitrogen and equipped with an 0.062 inch, round-holed screen. The comminuted mixture of polyisobutylene and TCP was collected cold and maintained under a protective atmosphere of nitrogen. This mixture was then re-ground using the same hammermill but equipped with a 0.013 inch herringbone screen. Again the reground mixture was collected cold and maintained under nitrogen.

The TCP used was obtained from the Stauffer Chemical Company, was anhydrous having the chemical formula $3Ca_3(PO_4)_2 \cdot Ca(OH)_2$, had a bulk density of approximately 20 lb/ft$^3$, and had a median particle size of less than about 1 micrometer as observed by electron microscopy.

A sample of the ground mixture, which was at a temperature approximating the boiling point of liquid nitrogen, was removed and examined visually under a microscope. The relatively large polyisobutylene particles were irregular and angular in appearance having sharp edges and vertices. Particles of TCP flowed freely around and among the polymer particles. This sample was allowed to warm to room temperature over a two-hour period and was again examined visually. The polyisobutylene particles had become much more rounded and softened in shape with a disappearance of the sharp edges and angularity previously observed.

The bulk of the ground mixture, weighing about 300 kg and comprising about equal weight fractions of TCP and polyisobutylene, was then transferred while cold and under a nitrogen atmosphere into a large, uninsulated, V-blender. The blender was rotated for about 20 minutes while the contents warmed by means of heat transfer through the blender shell. At the end of that time, the blender contents had warmed to near ambient and were free flowing, homogeneous and granular in appearance. No free polymer or TCP particles could be seen by visual inspection. The blender contents were then packaged in plastic bags.

Samples of the composition were examined by electron microscopy. FIGS. 2 and 3 are exemplary photomicrographs obtained.

EXAMPLE 2

A small quantity of the composition of Example 1 was added to a beaker containing diesel fuel. Particles of the composition were readily wet by the diesel fuel. The polymer core of the particles dissolved so rapidly that viscoelastic properties were imparted to the liquid within about 20 seconds as evidenced by the formation of strands when a stirring rod was removed from the liquid.

Other particles of the composition were placed on a microscope slide and arranged for viewing. Several drops of isooctane were placed on one end of the slide. As the isooctane contacted particles of the composition, the particles were seen to swell rapidly with the granular TCP coating cracking and falling apart as the polymer dissolved in the isooctane.

Particles of the composition were placed on another microscope slide and arranged for viewing. Several drops of water were placed on one end of the slide in the same manner as was the isooctane. So far as could be visually observed, water had no effect on the particles of the composition.

EXAMPLE 3

A sample of polyisobutylene particles coated with TCP prepared in the manner of Example 1 and weighing 1.5 g was placed in 250 ml of water in a stirred beaker. After a period of agitation, the slurry was allowed to settle for about one-half hour at which time essentially all of the particulate composition had settled to the bottom leaving a relatively clear supernatant liquid. The supernatant was decanted off and a fresh 250 ml portion of water was added. This stirring, settling and decantantation procedure was repeated for a total of four times on the same sample in order to determine the stability of the TCP coating toward water.

The settled slurry was filtered through qualitative filter paper and the filter cake was allowed to air dry for about 30 minutes. It was then visually inspected using a stereo microscope. The particles were free flowing and non-agglomerating and all of the particles appeared to have an intact coating of TCP. As was noted previously, the particles settled in water indicating a specific gravity greater than 1.0. Polyisobutylene has a specific gravity less than 1.0 and the TCP used in making the composition had a bulk density of about 20 lb/ft$^3$; about one-third the density of water. This particular lot of TCP-coated polyisobutylene contained about 52% polyisobutylene and 48% TCP by weight. It is evident from these considerations that the shell of TCP particles surrounding each core particle of polyisobutylene is very closely and tightly packed.

The dissolving rate in cyclohexane of particles of the filter cake was visually compared on a microscope slide with the dissolving rate of unwet particles of the same composition. No differences in dissolving rate were observed. It was concluded that extensive water contact with the TCP coating does not adversely affect the rate at which the composition particles will dissolve in an organic liquid.

EXAMPLE 4

A small quantity of polyisobutylene particles coated with TCP prepared in the manner of Example 1 was placed on a microscope slide and arranged for viewing. A 10% solution of nitric acid was added in a drop-wise fashion at one end of the slide. The advancing liquid acid completely dissolved the TCP coating around the particles leaving clean, glass-like core particles of polyisobutylene. A needle probe was used to bring the cleaned, core particles into contact with one another. As soon as one core particle touched another, the two adhered, or fused, together forming an agglomerate which could not be separated by manipulation of the agglomerate with probes.

In a generally similar experiment, the TCP-coated, polyisobutylene particles were suspended in a quantity of stirred water. Again, nitric acid was added in a drop-wise fashion until the TCP coating was entirely dissolved. At this point, the suspension cleared and several ball-like masses of polyisobutylene formed from the agglomerated core particles. By weighing the sample of polymer composition and by measuring the amount of acid of known concentration required to dissolve the TCP coating, this procedure may be used to determine the ratio of TCP to polyisobutylene making up the composition.

EXAMPLE 5

A procedure generally similar to that of Example 1 was employed to prepare a composition consisting of polyisobutylene and kaolin clay. The polyisobutylene and clay were co-ground in a liquid nitrogen-cooled hammer mill having an 0.062" herringbone screen. The comminuted mixture was collected cold and was reground in the same liquid nitrogen-cooled hammer mill now equipped with an 0.013" herringbone screen. The mixture was then placed in a laboratory V-blender which had been pre-chilled with liquid nitrogen and was tumble mixed for 30 minutes while allowing the mixture to warm.

The resulting particulate composition was generally similar to that obtained when using TCP as a coating agent. Liquid hydrocarbons such as isooctane and diesel fuel readily wet and penetrated the clay shell with subsequent rapid dissolution of the core polymer particle. Unlike TCP coatings, however, the clay was readily removed upon agitation of the composition in water resulting in agglomeration of the core particles.

EXAMPLE 6

A procedure generally similar to that of Example 5 was employed to prepare a composition consisting of polyisobutylene and a precipitated, amorphous hydrated silicon dioxide sold under the tradename Zeosyl 200. According to the manufacturer's specification sheet, this material has an average particle size of 4–6 micrometers as determined by the Coulter Counter Method. The resulting composition was similar in properties to that of Example 5.

EXAMPLE 7

A procedure generally similar to that of Example 5 was employed to prepare a composition consisting of polyisobutylene and graphite powder. The graphite powder was a product of Asbury Graphite Mills and was sold under the tradename Micro No. 270.

The polyisobutylene, BASF B-200, was first granulated cold through a 0.5 inch screen and collected in liquid nitrogen. It was again granulated, this time through a 3/32 inch screen, and again collected in liquid nitrogen. The granulated polymer was then mixed with graphite powder in a ratio of approximately 2:1 by weight. This mixture was ground in a hammer mill fitted with an 0.020 inch screen and the mill output was collected in a liquid nitrogen-chilled vessel provided with a securely closing top having pressure venting means. The mixture within the vessel was tumble mixed while it warmed and was then allowed to stand overnight.

A sample of the resulting composition was added to a quantity of kerosene in an amount sufficient to provide a 250 ppm concentration of polymer in the kerosene. The dissolving rate was very fast as evidenced by the fact that a significant degree of viscoelasticity had developed in the solution within 20 seconds of addition. The dissolving composition gave a black, smoky looking, birefringent solution. Filtration of the solution through a qualitative grade filter paper resulted in the removal of the graphite leaving a clear solution.

EXAMPLE 8

A composition consisting of an experimental antimisting polymer developed by the Shell Oil Company and designated SAP-960 together with an equal weight of TCP was prepared by first grinding the two materials together in a liquid nitrogen-cooled hammer mill equipped with an 0.062 inch herringbone screen. The ground mixture was collected at liquid nitrogen temperatures and was re-ground through a 0.027 inch screen. It was then tumble mixed in a V-blender for 30 minutes while allowing the mixture to warm up.

The resulting composition was indistinguishable in appearance from that obtained in Example 1. It reacted in the same manner to the tests described in Examples 2-4 as did the TCP-coated polyisobutylene particles.

EXAMPLE 9

A composition comprising core particles of Viton A and having an encompassing shell of Teflon particles was prepared. Viton A is fluoroelastomer being a copolymer of vinylidene fluoride and hexafluoropropylene. The Teflon particles were designated Teflon 7-C by the manufacturer, DuPont, and are generally used in extrusion and sintering fabrication procedures.

The Viton A was comminuted by chilling it with liquid nitrogen and passing it through a hammer mill. It was then mixed with Teflon 7-C powder in a weight ratio of Viton A to Teflon of approximately 1:2 and the mixture was re-ground to reduce the size of the Viton A and to obtain mixing of the two materials. Both the first and second grinding procedures were carried out with liquid nitrogen cooling.

The comminuted material was then tumble mixed while warming to obtain a relatively free flowing, homogeneous particulate composition. This composition could be readily mixed with other solids and could be extruded at moderate pressures and temperatures.

EXAMPLE 10

The composition of Example 1 was employed in a series of drag reduction tests in which the composition was introduced into a pipeline using the procedure illustrated by FIG. 4. The composition was introduced into the crude oil flowing within the pipeline at rates which provided a polyisobutylene concentration in the crude oil ranging from about 5 ppm to about 20 ppm. A substantial increase in the flow rate of the crude oil was observed as a result of the polymer addition.

EXAMPLE 11

The composition of Example 1 was dissolved in kerosene to obtain solutions having a polyisobutylene concentration ranging from about 1 to 10 ppm. The resulting solutions were passed through a fine nozzle and the exiting fluid streams were photographed at very high speeds and resolution. Kerosene without dissolved polymer produced a large population of very tiny droplets. As the polymer concentration in the kerosene increased, the population of tiny droplets in the nozzle stream decreased rapidly and, at the higher polymer concentrations, essentially disappeared.

EXAMPLE 12

A number of the polymer compositions described in the foregoing examples were tested to determine their efficiency in oil spill clean up processes. A laboratory model disk skimmer was constructed and consisted of a single disk with its axis oriented horizontally at a level above the surface of water within a test container. Means were provided at an upper portion of the disk to wipe and remove collected oil from the disk. The rotational speed of the disk was controllable over a wide range.

Tests were run using diesel fuel and a medium weight oil as the spilled hydrocarbons. In each case, a base performance level of the skimmer using the neat hydrocarbon was determined over the range of usable disk rotational speeds. Thereafter, a series of tests were run on each hydrocarbon at different polymer concentrations and skimmer speeds. It was found that the addition of sufficient quantities of the polymer compositions of this invention to impart viscoelastic properties to the spilled hydrocarbon in all cases significantly enhanced skimmer performance. A recovery enhancement factor was arbitrarily defined to be that ratio of the time required to pick up a unit volume of neat hydrocarbon divided by the time required to pick up a unit volume of hydrocarbon treated with the polymer compositions of this invention. Recovery enhancement factors of 2 to 3 were routinely achieved.

It was observed that substantial viscoelasticity was imparted to the medium weight oil at dissolved polymer concentrations as low as 50 to 100 ppm. In addition to increasing the hydrocarbon loading on the disk, the viscoelasticity tended to prevent depletion of the oil on the water surface adjacent the disk. Oil was continually drawn to the rotating disk from distant areas of the water surface. Further, the oil did not break up into patches or clumps as is commonplace with the untreated, or neat, oil.

Confirmatory tests were performed using several different types of full-size, commercial skimmers on a test pond. The performance of the skimmers operating on spilled hydrocarbons having a sufficient amount of the polymer composition of this invention dissolved therein to render the spilled hydrocarbons viscoelastic exceeded the expectations gained from laboratory experimentation.

The above examples have been set out to illustrate a number of specific embodiments of this invention. The data and observations presented therein are not to be construed as limiting the scope of the inventive compositions nor their uses.

We claim:

1. A method for imparting anti-misting properties to a fuel suitable for use on turbine and diesel engines comprising:

adding to said fuel a rapid dissolving, particulate polymer composition in an amount sufficient to substantially eliminate that population of fuel droplets having a diameter of less than about 50 micrometers normally produced when pure fuel is subjected to wind shear, the particles of said polymer composition having a central core consisting of a high molecular weight thermoplastic polymer which imparts viscoelastic properties to a solution of said polymer in said fuel, said central core having clean surfaces and being surrounded by a multilayered shell of an adherent, particulate, coating agent selected from the group consisting of tricalcium phosphate and graphite having a particle size much smaller than that of the central core and having the interstices between the coating agent particles and around the core filled with an inert gas.

2. The method of claim 1 wherein said polymer has a molecular weight in excess of 5 million.

3. The method of claim 2 wherein said polymer is selected from the group consisting of polyisobutylene, polyisoprene, polyalpha-olefins, polybutadiene, copolymers of ethylene and butene-1 and copolymers of styrene and butadiene.

4. The method of claim 2 wherein said fuel is Jet A, said polymer is polyisobutylene and said coating agent is tricalcium phosphate.

5. The method of claim 2 wherein said fuel is Jet A, said polymer is polyisobutylene and said coating agent is graphite.

6. The method of claim 2 wherein the amount of polymer composition added to said fuel is sufficient to provide a polymer concentration in said fuel ranging from about 5 to about 100 ppm by weight.

* * * * *